Aug. 30, 1932.   C. W. STEWARD   1,874,650
AEROPLANE LANDING GEAR
Filed Sept. 30, 1930
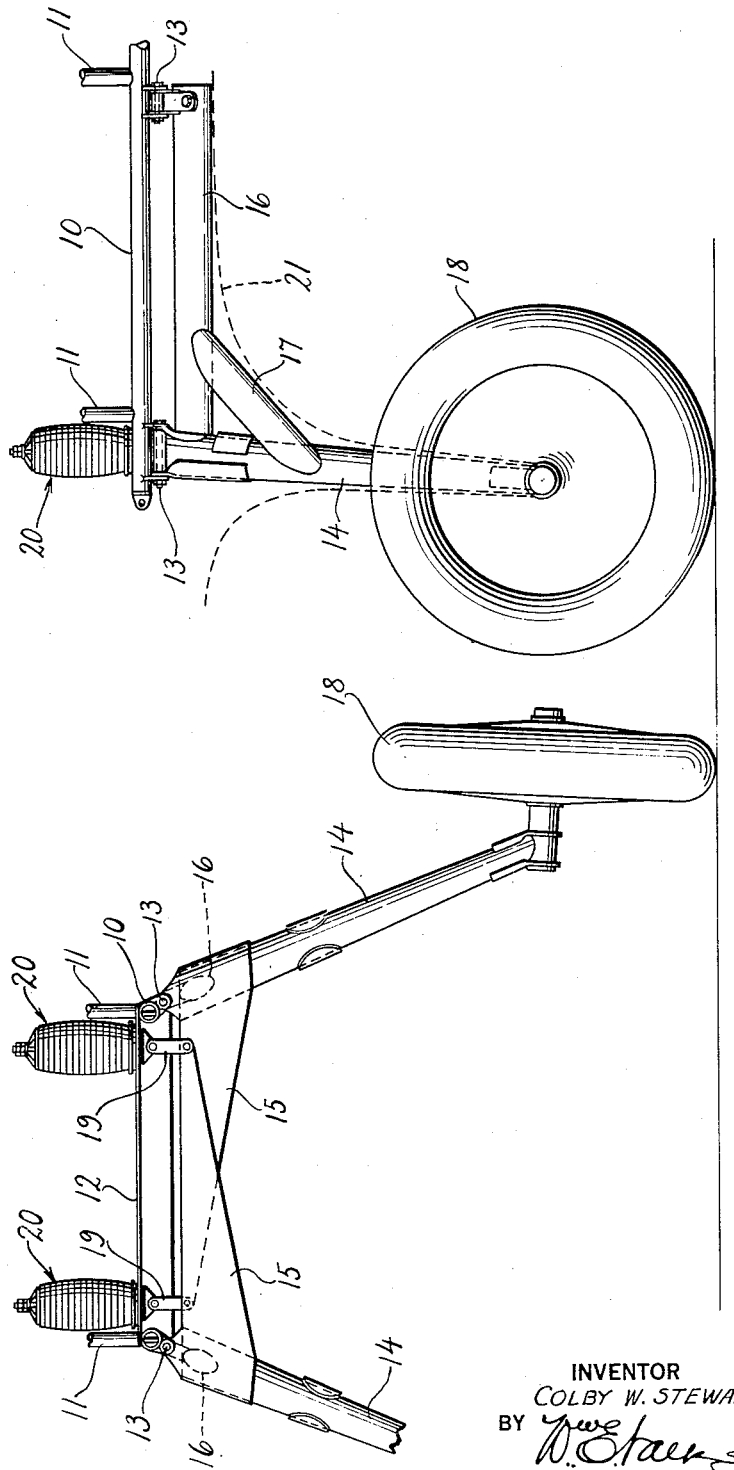
INVENTOR
COLBY W. STEWARD
BY
ATTORNEY Patented Aug. 30, 1932

1,874,650

UNITED STATES PATENT OFFICE

COLBY W. STEWARD, OF FRANKLIN SQUARE, NEW YORK, ASSIGNOR TO CURTISS AEROPLANE & MOTOR COMPANY, INC., A CORPORATION OF NEW YORK

AEROPLANE LANDING GEAR

Application filed September 30, 1930. Serial No. 485,415.

My invention relates to aeroplane landing gears.

The so-called "axleless" type landing gear is now extensively used in both military and commercial types of aeroplanes. The advantages of this type landing gear are fully set forth in U. S. Patent #1,584,466 issued to Harvey C. Mummert, et al., May 11, 1926. With this particular type landing gear the present invention is concerned.

One object of the invention is to reduce to a minimum the number of landing gear parts. A further object of the invention is to minimize weight. The most important object of the invention, however, is to eliminate insofar as possible the parasite resistance or "drag".

In attaining the above and other objects and advantages of the invention a different system of landing gear strut bracing is employed. As in the Mummert, et al. patent the landing gear comprises two independently acting landing gear frames, each carrying, at the outer ends of the landing gear struts appropriate landing device, preferably landing gear wheels. The landing gear struts, however, are not braced both transversely and longitudinally by exposed diagonal strut braces, but are braced instead by an arrangement of parts tending to remove from the airstream practically the entire bracing system. The details of the system will be hereinafter set forth.

In the drawing, wherein like reference characters denote like or corresponding parts, Fig. 1 is a front elevation of the landing gear with a portion of one strut and its associated landing gear wheel broken away, and Fig. 2 is a side elevation of the landing gear.

In the embodiment of the invention selected for illustration only that portion of the aeroplane structure (herein the fuselage or body) to which the landing gear is directly attached is shown. Such portion includes the usual longérons 10, fuselage or body struts 11, and cross-body bracing 12. If used in connection with a different type aeroplane the landing gear might very conceivably be attached or fastened to the aeroplane wing or wings.

As intimated, the landing gear per se comprises two independently acting landing gear frames. The frames may or may not transversely overlap, depending entirely upon the width of landing tread deemed appropriate for a given design. Each frame is pivoted as at 13—13 to the aeroplane structure, the pivot axes, in each instance, extending in a fore and aft direction.

As the frames are identical in construction a detail description of but one thereof will suffice. Each frame comprises a relatively heavy landing gear strut 14, a transversely extending frame member 15, and a longitudinally extending strut brace 16, the latter, at its forward end having a widened or gusset-like connection 17 with the landing gear strut. The strut 14 carries at its outer end a landing gear wheel 18. At its opposite or inner end it has rigidly fastened thereto the transverse frame member 15 as well as the longitudinally extending strut brace 16. Preferably the member 15 and the brace 16 make substantially a rightangle one with the other (viewed in plan).

The frame member 15 is in effect a cantilever arm. From its point of support at the inner end of the strut 14 it decreases in cross-sectional area, and at its outer or smaller end is linked as at 19 to an appropriate shock absorber unit similar to that disclosed in the Mummert, et al. patent. Together with the frame member 15, the strut 14 constitutes the only connection between the shock absorber and the landing gear wheel.

Both the frame 15 and the strut brace 16 lie normally close up against the underside of the aeroplane structure so as to at all times offer a very minimum of parasite resistance or drag. At no point throughout the outer half length of the strut 14 is there any connection whatsoever with either the cross-frame member 15 or the strut brace 16. The strut itself, which is preferably a relatively heavy tapering steel tube, is so proportioned as to safely sustain all operating loads in actual use and, if desired, as a further aid in reducing resistance, may be completely encased along with the gusset 17 and strut brace 16 in a unit boot or fairing piece 21 (see Fig. 2). The crux of the invention, however, lies in the landing gear frame parts arrangement whereby a lighter, less costly and less resistant landing gear structure is evolved.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. In an aeroplane; a landing gear frame comprising three struts joined rigidly at an apex, one of said struts projecting downwardly and outwardly from said apex and carrying at its outer end a landing gear wheel, the second of said struts projecting rearwardly from said apex, substantially parallel to the longitudinal axis of said aeroplane and pivoted at said apex and at its rearward end to said aeroplane to permit lateral swinging movement of said landing gear, said pivots being longitudinally widely spaced, and the third said strut projecting from said apex transversely and substantially parallel to the lateral axis of said aeroplane; and a shock absorbing device between said aeroplane and the end of said laterally extending strut.

2. In an aeroplane; a landing gear frame comprising three struts joined rigidly at an apex, one of said struts projecting downwardly and outwardly from said apex and carrying at its outer end a landing gear wheel, the second of said struts projecting rearwardly from said apex and substantially parallel to the longitudinal axis of said aeroplane and pivoted at said apex and at its rearward end to said aeroplane to permit lateral swinging movement of said landing gear, said pivots being longitudinally widely spaced, and the third said strut projecting from said apex transversely and substantially parallel to the lateral axis of said aeroplane; a shock absorbing device between said aeroplane and the end of said laterally extending strut, and bracing means fixed between said longitudinally extending strut and said downwardly projecting strut, said bracing means being attached to said downwardly projecting strut at a point less than half the distance from said apex to its outer end.

In testimony whereof I hereunto affix my signature.

COLBY W. STEWARD.